(12) United States Patent
Draxten (10) Patent No.: US 9,010,828 B2
(45) Date of Patent: Apr. 21, 2015

(54) FLOATING RETRIEVAL DEVICE

(71) Applicant: Bret Draxten, Glendale, AZ (US)

(72) Inventor: Bret Draxten, Glendale, AZ (US)

( * ) Notice: Subject to any disclaimer, the term of this patent is extended or adjusted under 35 U.S.C. 154(b) by 0 days.

(21) Appl. No.: 14/272,534

(22) Filed: May 8, 2014

(65) Prior Publication Data

US 2014/0284949 A1    Sep. 25, 2014

Related U.S. Application Data

(63) Continuation-in-part of application No. 13/787,864, filed on Mar. 7, 2013.

(51) Int. Cl.
| | | |
|---|---|---|
| *B66F 19/00* | (2006.01) | |
| *F41H 13/00* | (2006.01) | |
| *A01D 44/00* | (2006.01) | |
| *F42B 6/02* | (2006.01) | |
| *F41B 7/04* | (2006.01) | |

(52) U.S. Cl.
CPC ............ *B66F 19/00* (2013.01); *F41H 13/0006* (2013.01); *A63B 2225/60* (2013.01); *A01D 44/00* (2013.01); *F42B 6/02* (2013.01); *F41B 7/04* (2013.01)

(58) Field of Classification Search
CPC ............ A01B 1/18; A01B 1/16; B25G 3/02; B25J 1/04; E01H 5/02; B63B 21/12; B63B 21/54; B63B 21/00; B63B 17/00; B63G 7/04; A01K 97/24; A01K 97/00; A01K 97/14; A01K 97/01; A01K 91/18; A01D 7/10; A01D 44/00; A01D 7/00; A01D 7/06; A01D 7/04; A47L 13/20; A47L 13/24; A47L 13/252; A47L 13/256; A47L 13/255; A61B 17/221; A61B 2017/2212; A61B 17/32056; A61B 2017/00526; H01L 27/115
USPC .............. 294/209, 210, 211, 50.6, 50.8, 50.9, 294/53.5, 24, 57, 181, 66.1; 114/221 R; 43/4, 5, 17.2; 56/8, 400.04, 400.06, 56/400.16, 400.19, 400.2, 400.21; 15/144.4, 144.1, 229.6, 229.8, 228, 15/247.2, 147.2
See application file for complete search history.

(56) References Cited

U.S. PATENT DOCUMENTS

| | | | | |
|---|---|---|---|---|
| 2,722,075 | A * | 11/1955 | Abrassart | 43/1 |
| 2,949,003 | A * | 8/1960 | Wilcox | 56/8 |
| 3,766,880 | A * | 10/1973 | Ramsey et al. | 114/241 |
| 3,972,552 | A * | 8/1976 | Earp, Jr. | 294/112 |
| 6,748,728 | B2 | 6/2004 | Hay | |
| D538,864 | S * | 3/2007 | Crippen | D21/721 |
| 7,677,620 | B1 | 3/2010 | Tasey | |
| 7,832,105 | B2 | 11/2010 | Vogel | |
| 8,313,392 | B2 * | 11/2012 | White | 473/316 |
| 2011/0239604 | A1 * | 10/2011 | Amundson | 56/8 |

OTHER PUBLICATIONS

U.S. Appl. No. 13/787,864, filed Mar. 7, 2013, Draxten.

* cited by examiner

*Primary Examiner* — Stephen Vu (57) ABSTRACT

A floating retrieval device that can be either manually launched or automatically launched via a compression spring.

12 Claims, 8 Drawing Sheets

FLOATING RETRIEVAL DEVICE

This application is a continuation-in-part application of U.S. Ser. No. 13/787,036, filed Mar. 7, 2013, which has been abandoned.

BACKGROUND OF THE INVENTION

The use of devices to retrieve items that are not reachable in the water is not new to the art. Some examples of retrieval devices include U.S. Pat. No. 7,832,105 issued to Vogel on Nov. 16, 2010; entitled "Water Plant Removal Tool" which describes a manually operated cutting tool that is pulled across the surface of water to cut weeds. The device is inferior to the present device because it has to have an additional component added to become buoyant.

The current device floats and can have fingers that extend both upward and downward to retrieve objects that are partially afloat, such as waterfowl. This prior art device also has cutting blades to cut vegetation whereas the present invention is for retrieval only.

Another prior art device that is used to retrieve vegetation from the bed of a lake is disclosed in U.S. Pat. No. 6,748,728 issued to Hay on Jun. 15, 2004, entitled "Rake System and Method for Removing Underwater Vegetation. This device is pulled along the lake bed to remove and retrieve weeds.

Another device for retrieving floating objects is U.S. Pat. No. 7,677,620 issued to Tasey on Mar. 16, 2010, entitled "Disc Retrieving Apparatus" that discloses a telescopic handle rake to retrieve objects from water. The device is seriously limited, in that, you can only retrieve items within reach of the handle.

THE INVENTION

The present device is a floating retrieval device. The device has a hollow, elongated shaft that has a near end and a distal end. The end of the shaft has a hollow handle attached thereto. This handle has a near end. The distal end has a latch mounted thereon. The latch has rotatably mounted thereon a pair of oppositely opposed retrieval wings. The retrieval, wings are comprised of a shaft that may have a plurality of elongated teeth mounted thereon. There is a retainer located near the near end of the handle, on the hollow shaft, and the retainer is configured to retain the retrieval wings while the retrieval wings are in a folded position.

There is also a cable. The cable is independently attached to each retrieval wing and the cable runs through the hollow elongated shaft and exits near the near end of the handle.

The present invention has no cutting device and is meant to recover floating items. The present device is deployed either manually or by spring compression and once it has hit the water a line deploys the wings and the device can be retrieved bringing the floating item to the user.

It has been discovered that the present invention can recover items from a considerable distance, giving it a greater utility over all prior art devices.

DETAILED DESCRIPTION OF THE DRAWINGS

Figure 1:
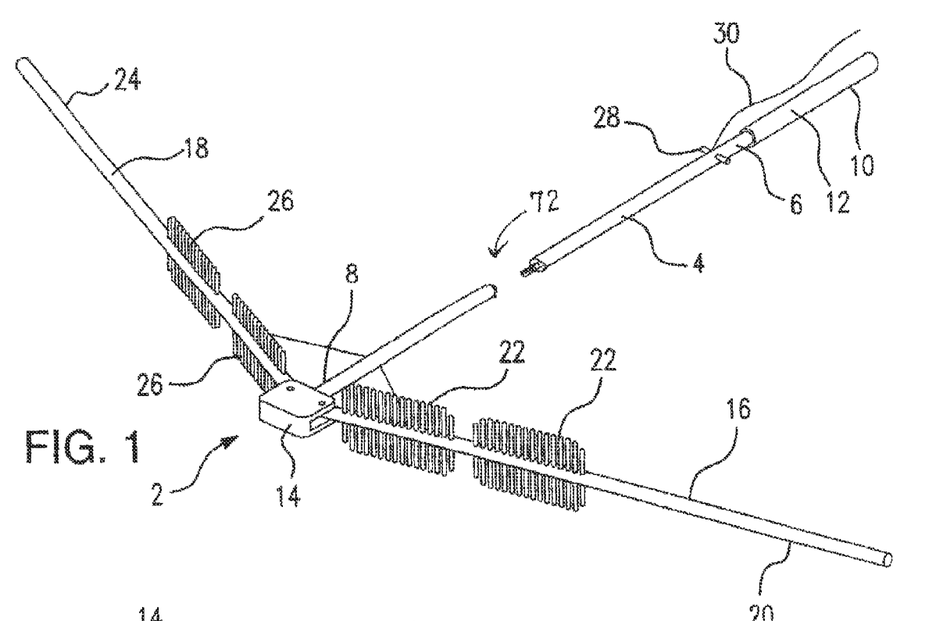
FIG. 1 is a view in perspective frontal view of the manual embodiment of the floating retrieval device showing it deployed.
Figure 4:
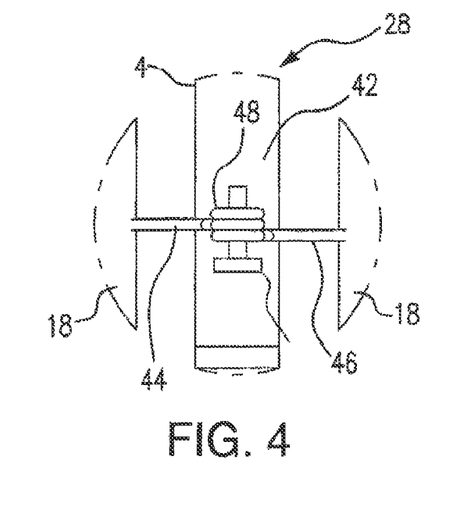
FIG. 4 is a full top view of a latching system of the floating retrieval device.

FIG. 1 shows the manual embodiment of the floating retrieval device 2, deployed. The hollow shaft 4 has a near end 6 and a distal end 8. The near end 6 of the hollow shaft 4 has a handle 10 attached to it. The near end 12 of handle 10 attached to the near end 6 of the hollow shaft 4. The near end 6 of hollow shaft 4 has a latch 28 for keeping the wings 16 and 18 in a stowed position. FIG. 4 provides a more detailed teaching of the latch 28.

At the distal end 8 of the hollow shaft 4 is a latch 14 that has wings 16 and 18 respectively attached thereto. The first wing 16 has a shaft portion 20 and this section supports teeth 22. The second wing 18 also had a shaft portion 24 that supports teeth 26. It is contemplated within the scope of this invention that no teeth are required on the shafts. There is also a cable 30 that is threaded through the hollow shaft for the deployment of the wings 16 and 18.

This embodiment is designed to be manually thrown beyond the object that needs to be retrieved. The cable 30 is pulled which deploys the win 16 and 18 and the cable 30 is manually retrieved bringing the desired object to the user.

Figure 2:
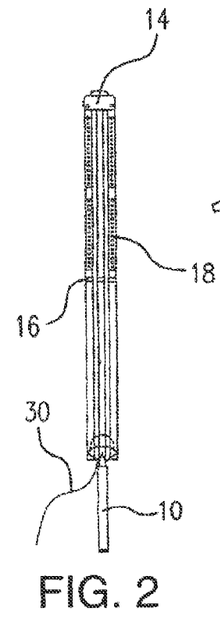
FIG. 2 is a view from the side showing the manual embodiment of the floating retrieval device closed ready to be launched.

FIG. 2 shows the manual embodiment of the floating retrieval device 2 closed, ready to be launched. Here again with the wings 16 and 18 in the nondeployed or locked position the floating retrieval device 2 is ready to be launched or thrown. The latch 14 of the floating retrieval device is spring loaded. After the floating retrieval device has been thrown the cable 30 is pulled and the wings 16 and 18 move away front the hollow shaft 4 or deploy. At this point the cable 30 is retrieved bringing the desired item to the user.

Figure 3:
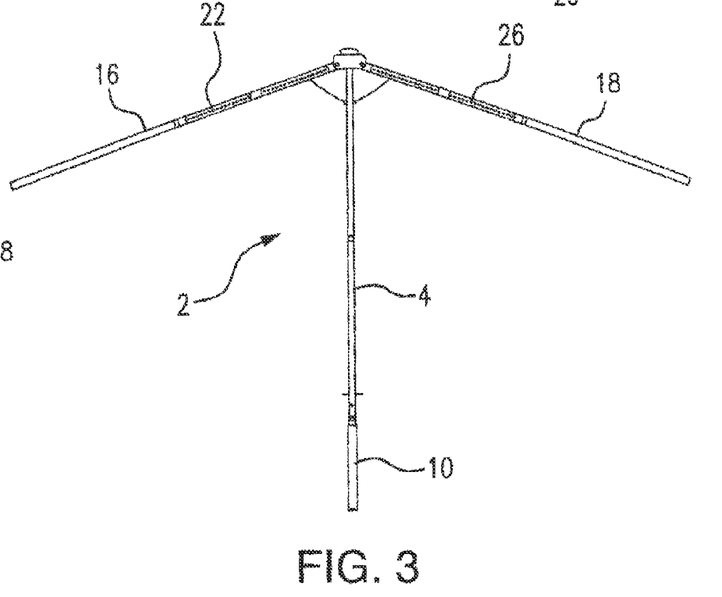
FIG. 3 is a full top view of the manual embodiment of the floating retrieval device deployed.

FIG. 3 shows the manual embodiment of the floating retrieval device 2, deployed. At this point the floating retrieval device is ready to be retrieved. The cable 30 is pulled in or retrieved while the wings 16 and 18 with their respective teeth 22 and 24 rake the surface of the water grasping the item to be retrieved and returning it to the user. The user can simply latch the wings 16 and 18 down again and the floating retrieval device is ready to be launched or thrown again.

FIG. 4 shows the latching system 28 of the floating retrieval device 2. This embodiment allows the user to close the wings 16 and 18 with each fitted with a small eye bolt 44 and 46. There is also an eye bolt fitted to the hollow shaft 4. The wings 16 and 18 are brought together and pinned with the eye bolt pin 42. A line 50 is attached to the pin 42 and pulled out when the wings 16 and 18 need to be deployed.

Figure 5:
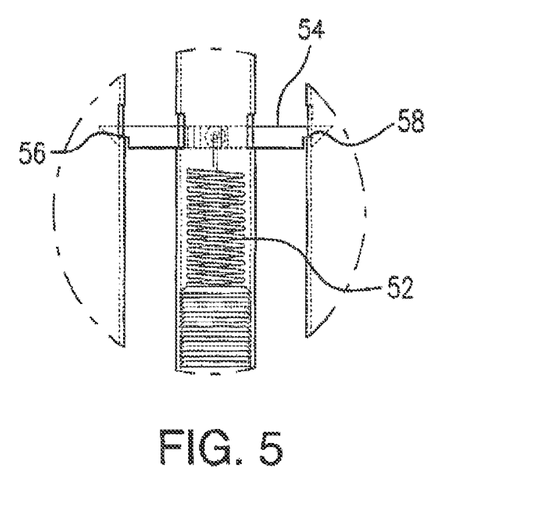
FIG. 5 is a full top view of a spring latching system of the floating retrieval device.

FIG. 5 shows the spring latching system 52 of the floating retrieval device 2. This embodiment works in much the same way as that of FIG. 4. However, the wings 16 and 18 are held in place by a latch 54 that is attached to a spring 52 and a line 50. There are notches 56 and 58 respectively on the latch 54 that hold the wings to the latch 54. The line 50 is pulled compressing the spring 52 allowing the wings 16 and 18 to deploy.

Figure 6:
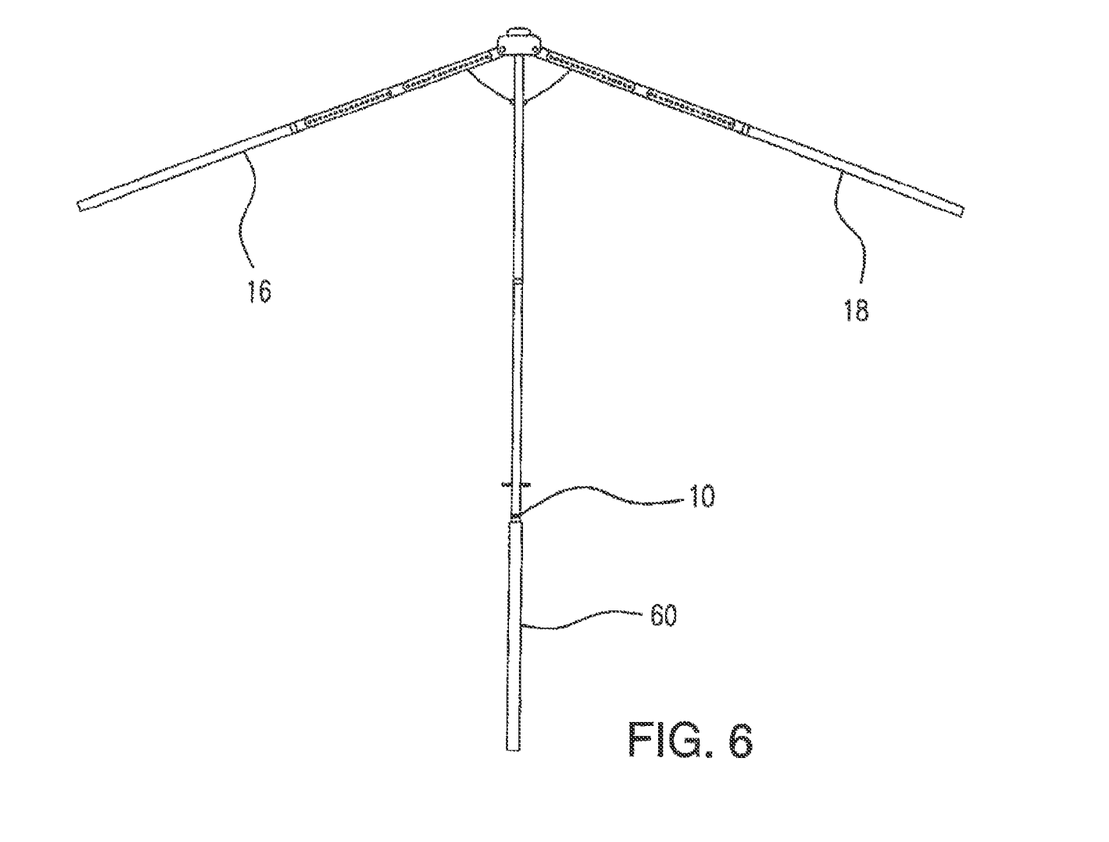
FIG. 6 is illustrates an auto launch handle of the device of FIG. 3.

FIG. 6 shows the auto launch embodiment of the floating retrieval device 2. This embodiment has the ability to launch automatically on demand. The handle 10 is forced into a secondary handle 60 that is capable of receiving the hollow handle, while compressing a spring 62 within the secondary handle 60. The hollow handle 10 is now locked within the secondary handle 60. There is also a trigger type mechanism 64 on the secondary handle that will click when the handle 10 is fully compressing the compression spring 62 and locked. The compression spring is not shown because it is within the secondary handle 60. (See FIG. 5). Designation 72 shows the joining of the segments of the rod, wherein the joining is accomplished by threads (see FIGS. 6 and 8).

The user simply points the floating retrieving device and pulls the trigger 64. Then the user pulls the cable 30 to deploy the wings 16 and 18. Then the user can reel the cable 30 in retrieving the floating retrieval device 2. The secondary handle 60 is equipped with a fishing type reel 66 (See FIGS. 7 and 8) in this embodiment.

Figure 7:
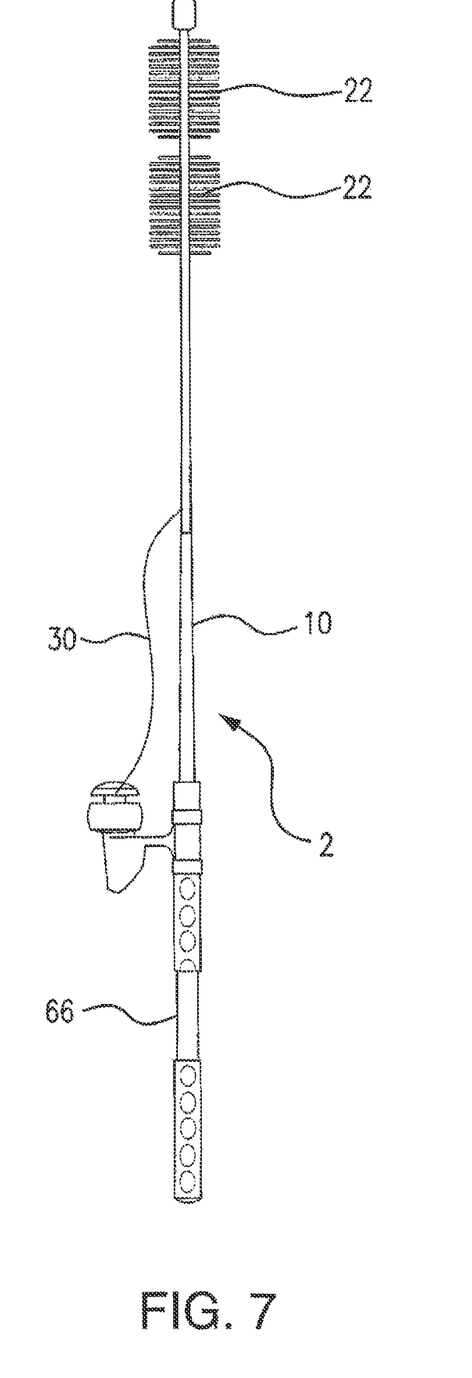
FIG. 7 is a full side view of the auto launch embodiment of the floating retrieval device.

FIG. 7 shows the auto launch embodiment of the floating retrieval device 2 from the side. Here the fishing reel 66 is shown. It is also cleat how the hollow handle 10 fits into the secondary handle 60. The teeth 22 are also shown.

Figure 8:
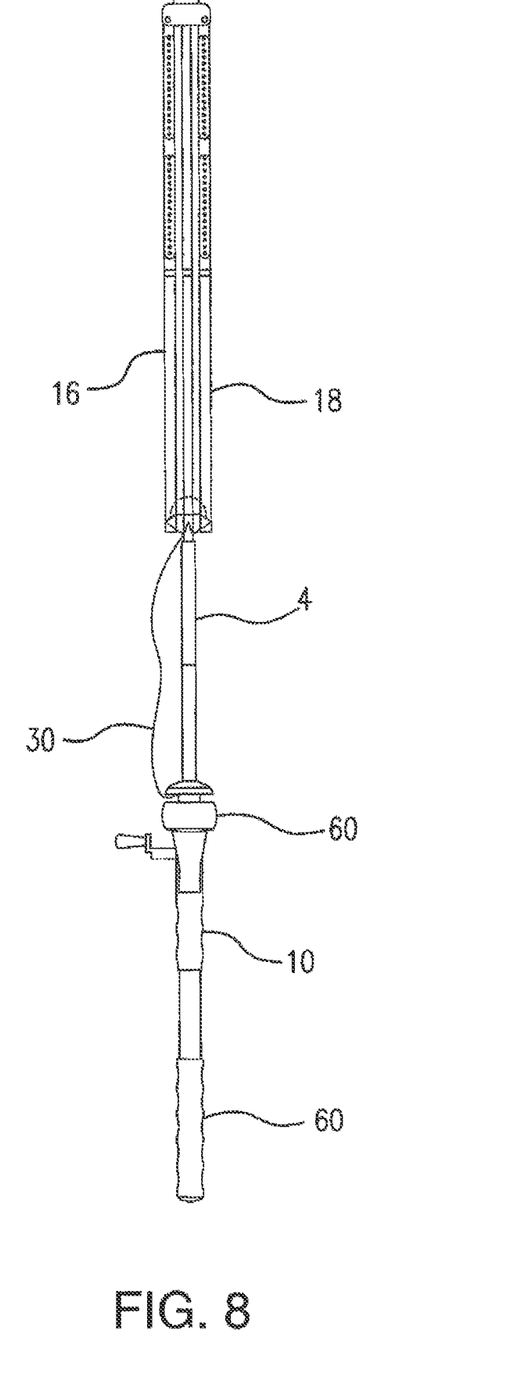
FIG. 8 is a full top view of the auto launch embodiment of the floating retrieval.

FIG. 8 shows the auto launch embodiment of the floating retrieval device 2 from the front. Here the floating retrieval device 2 is not deployed. The hollow handle 10 of the hollow shaft 4 is inserted into the secondary handle 66 with a fishing reel 66 present. The fishing reel 66 has cable 30 attached for the deployment of the wings 16 and 18.

Figure 9:
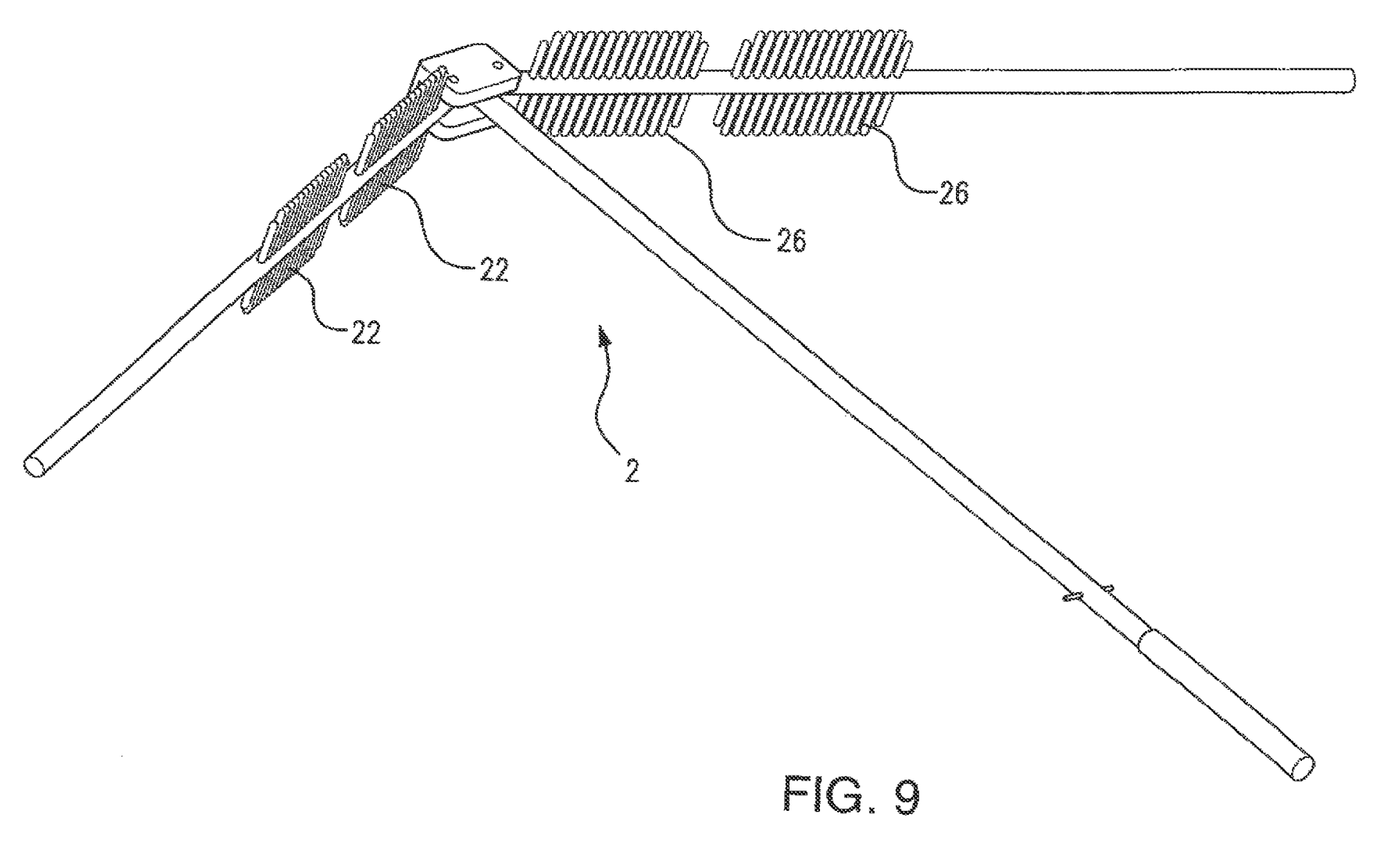
FIG. 9 is an anterior view of the device of FIG. 1.

FIG. 9 shows the manual launch embodiment of the floating retrieval device 2. This shows the significance of the teeth 22 and 24 in the retrieval process. It has been discovered that the teeth 22 and 24 add extra area to the floating retrieval device 2 giving it greater utility over any other prior art devices.

Figure 10:
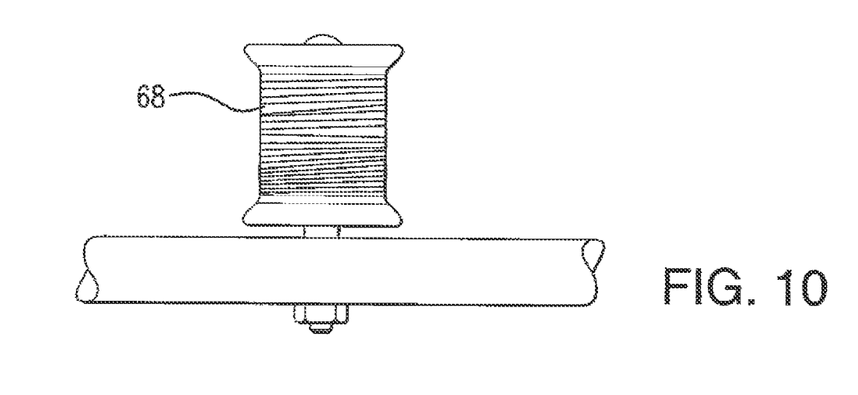
FIG. 10 is a partial view of an alternative retrieval device which is a bobbin.

FIG. 10 shows the auto launch handle of the floating retrieval device 2 with a cable retrieval device 68. This Figure teaches another embodiment where instead of a fishing reel 66 for retrieval of the cable 30 the secondary handle 60 has a bobbin type retriever 68. This allows the cable to free spool off of the bobbin and then it must be rewound in preparation to launch or throw again depending on it you are operating the manual or auto launch embodiments.

Figure 11:
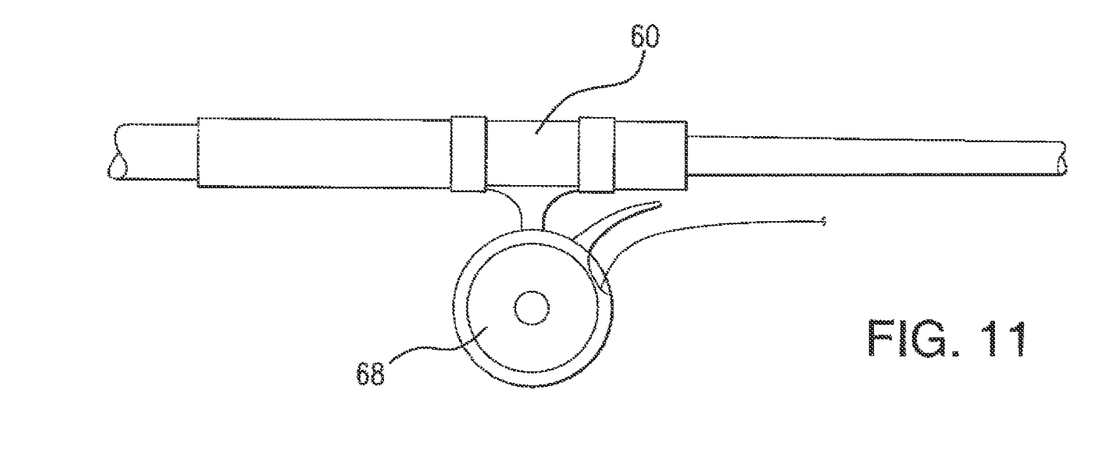
FIG. 11 is a full side view of a portion of the auto launch handle of the floating retrieval device with a cable retrieval device.
Figure 12:
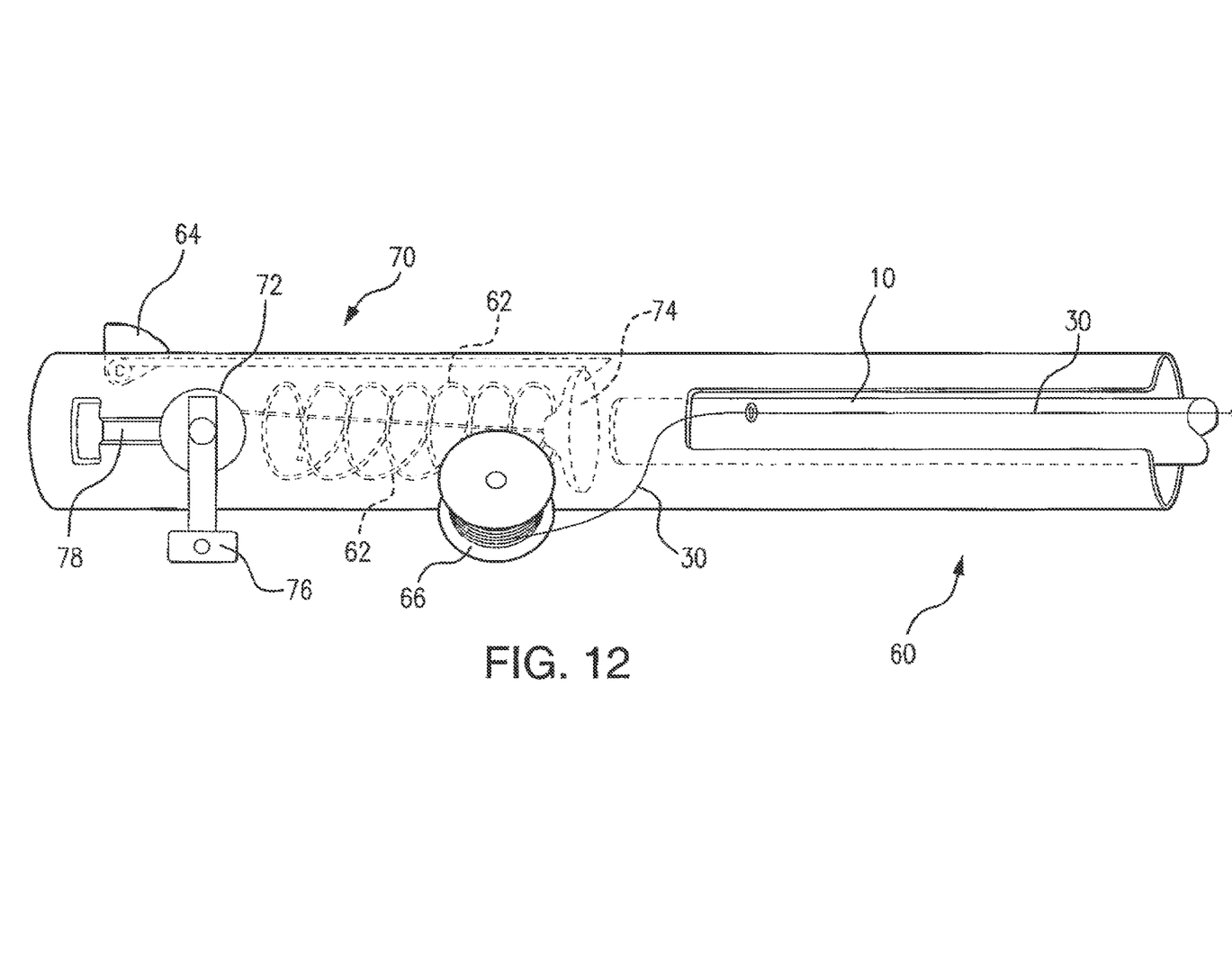
FIG. 12 shows an internal view along line A-A of the secondary handle.
Figure 13:
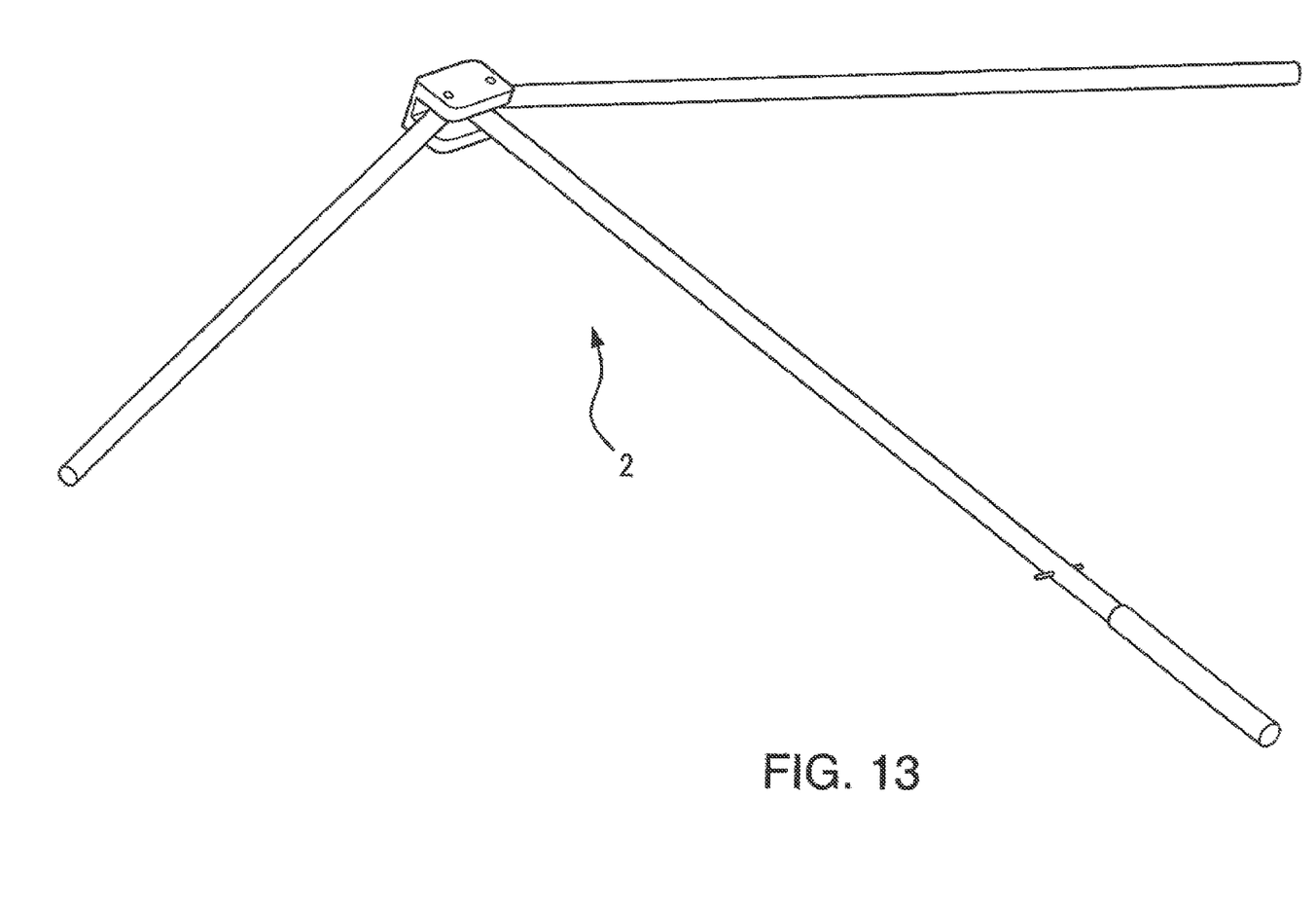
FIG. 13 is an anterior view of the device without teeth.
Figure 14:
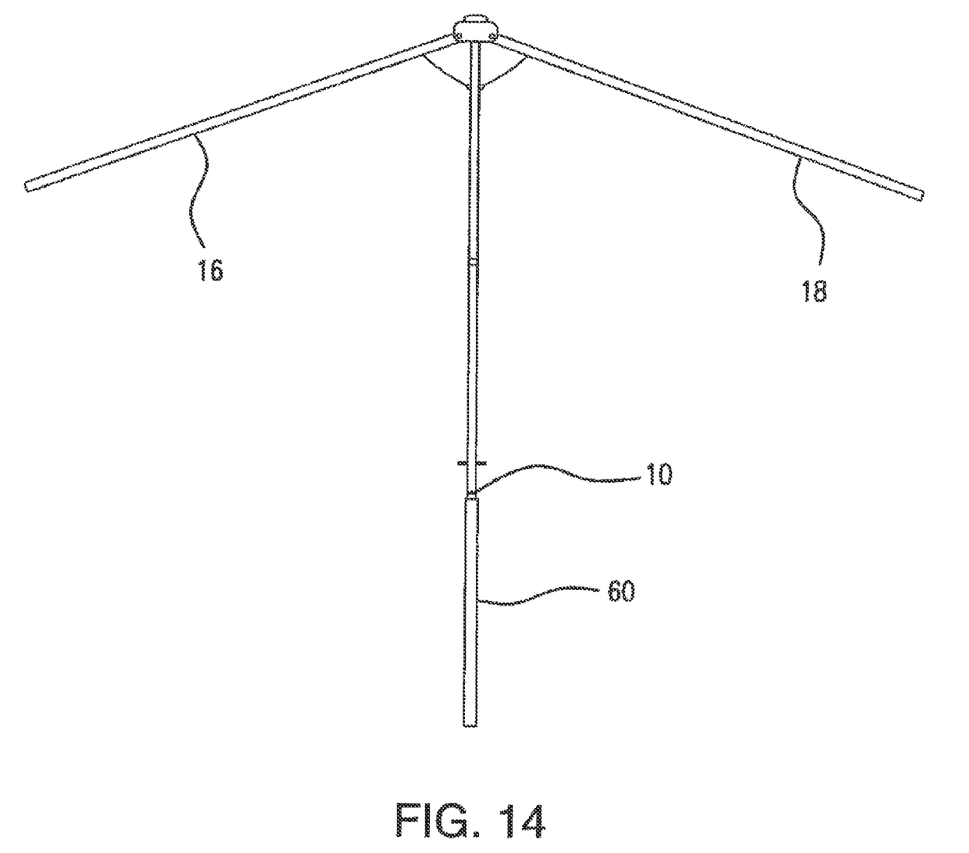
FIG. 14 is a full top view of the device of FIG. 13.

FIG. 11 shows the auto launch handle of the floating retrieval device 2 with a cable retrieval device 70. This embodiment has a reel that incorporates a coil spring drive device that drives the retrieval. Simply pull the trigger and the coil spring driven reel automatically brings the line in and the floating retrieval device 2 is ready to be used again.

In summary, the floating retrieval device 2 is a hand held device that can be thrown or launched in an effort to retrieve or recover items floating at a distance. One embodiment is simply thrown and the cable 30 is pulled deploying the wings 16 and 18 and the floating retrieval device is recovered either manually or with a reeling device of varying sorts via cable 30.

Another embodiment of the floating retrieval device 2 has a secondary handle 60 that contains a compression spring 62 within it. When the handle 10 of the floating retrieval device 2 is forced into the secondary handle it compresses the spring 62 and then locks within the secondary handle 60 to be released by a trigger 64. The cable is once again pulled deploying the wings 16 and 18 and the floating retrieval device is either pulled in or reeled in.

What is claimed is:

1. A floating retrieval device, said device having a hollow, elongated shaft having a near end and a distal end;
   said near end of said shaft having a hollow handle attached thereto, said handle having a near end;
   said distal end having a latch mounted thereon, said latch having rotatably mounted thereto, a pair of oppositely opposed retrieval wings, said retrieval wings comprised of a shaft;
   a retainer located near said near end of said handle, on said hollow shaft, and said retainer configured to retain said retrieval wings while said retrieval wings are in a folded position;
   a cable, said cable being independently attached to each retrieval wing and said cable running through said hollow elongated shaft and exiting near said near end of said handle.

2. The floating retrieval device as claimed in claim 1 wherein said elongated shaft is comprised of segments to be joined together to form said elongated shaft.

3. The floating retrieval device as claimed in claim 2 wherein said segments are threaded on said ends thereof.

4. The floating retrieval device as claimed in claim 1 wherein said device is manufactured from aluminum.

5. The floating retrieval device as claimed in claim 1 wherein said device is manufactured from plastic.

6. A floating retrieval device, said device having an elongated shaft having a near end and a distal end;
   said near end of said shaft having a hollow handle attached thereto, said handle having a near end, there being attached to said handle, a means of retrieving said floating retrieval device;
   said distal end having a latch mounted thereon, said latch having rotatable mounted thereto, a pair of oppositely opposed retrieval wings, said retrieval wings comprised of a shaft;
   a retainer located near said near end of said handle, on said hollow shaft, and said retainer configured to retain said retrieval wings while said retrieval wings are in a folded position;
   a cable, said cable being independently attached to each retrieval wing, said opposite end of said cable being attached to said means for retrieval of said floating retrieval device;
   a compressible spring mounted on said elongated shaft, one end of said spring being attached to said handle, near said near end of said handle, and said opposite end of said spring being adjacent to a middle point of said elongated shaft, there being a trigger release suppressing said spring when compressed, said trigger release being mounted on said elongated shaft adjacent to said retrieval device.

7. The floating retrieval device as claimed in claim 6 wherein said elongated shaft is comprised of segments to be joined together to form said elongated shaft.

8. The floating retrieval device as claimed in claim 7 wherein said segments are threaded on said ends thereof.

9. The floating retrieval device as claimed in claim 6 wherein said means for retrieval of said floating retrieval device is a fishing reel and line.

10. The floating retrieval device as claimed in claim 6 wherein said means for retrieval of said floating retrieval device is a bobbin.

11. The floating retrieval device as claimed in claim 6 wherein said device is manufactured from aluminum.

12. The floating retrieval device as claimed in claim 6 wherein said device is manufactured from plastic.

* * * * *